W. E. NICKERSON.
Bark-Reducing Machine.

No. 211,666. Patented Jan. 28, 1879.

WITNESSES
Frank G. Parker
Chas. E. Griffin

INVENTOR
William E. Nickerson

UNITED STATES PATENT OFFICE.

WILLIAM E. NICKERSON, OF SOMERVILLE, MASSACHUSETTS.

IMPROVEMENT IN BARK-REDUCING MACHINES.

Specification forming part of Letters Patent No. 211,666, dated January 28, 1879; application filed April 27, 1878.

*To all whom it may concern:*

Be it known that I, WILLIAM E. NICKERSON, of Somerville, in the county of Middlesex and State of Massachusetts, have invented certain new and useful Improvements in Machines for Grinding Bark, of which the following is a specification:

My invention relates to that class of bark-grinding mills in which the bark is granulated by means of a cylinder having rows of teeth, the teeth of each alternate row projecting beyond the teeth of the intermediate ones, so that the bark is first kerfed and then scraped off, as is fully shown and set forth in the specification of Letters Patent of the United States granted to me April 2, 1878, and numbered 201,938, and entitled "cutters for reducing bark."

Said invention consists in forming the end of the bark-supporting table with alternate projections and recesses, said projections and recesses corresponding in number, arrangement, and size with the rows of teeth on the grinding-cylinder. The recesses in this table receive the kerf-cutting teeth, while the projections advance between the rows of said teeth nearly to the face of the scraping-teeth.

Figure 1:
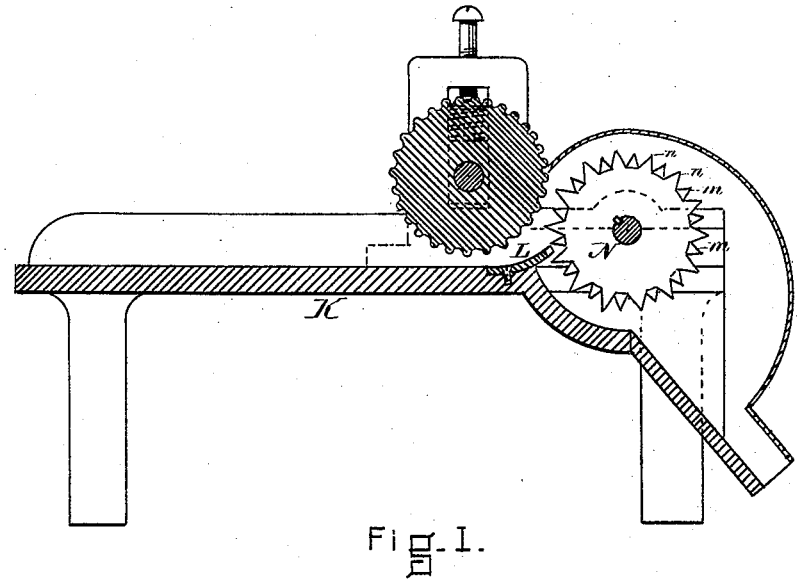
Figure 2:
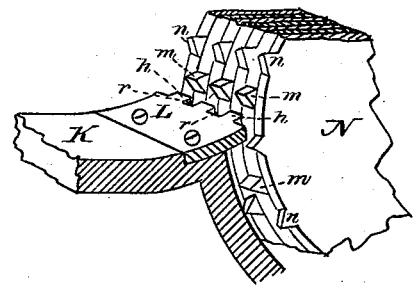
Figure 3:
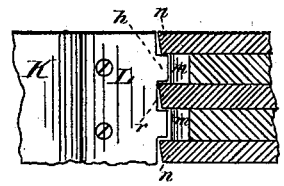

Referring to the drawings, Figure 1 is a vertical section of my machine. Fig. 2 is a perspective, showing a part of the grinding-cylinder and a part of the table. Fig. 3 is a plan of the same.

K represents the table, over which the bark is fed to the grinding-cylinder N. This cylinder N has rows of cutting-teeth $n$, which project beyond the rows of scraping-teeth $m$, as shown in Figs. 2 and 3. The end of the table K terminates in a series of projections, $h$, and recesses $r$, so that the grinding-cylinder may be adjusted to run very closely to the end of the table. The long or cutting teeth $n$ advance into the recesses $r$, while the short or scraping teeth $m$ barely escape contact with the projections $h$. By this arrangement and adjustment it will be seen that it is impossible for any bark to get through the mill except it be reduced to very fine grains, whereas, if the end of the table K were not provided with projections and recesses, it would have to be adjusted so as to allow the large teeth $n$ to pass it, thus leaving considerable space between the ends of the short teeth $m$ and the end of the table, thus making it possible for slivers of bark to pass through the mill.

If desirable, the end of the table K may be formed of a separate piece, as indicated by L, which may be readily adjusted or renewed when worn, and may be made, if desirable, of some comparatively soft material, like lead, hard rubber, or some very firm wood, so that in case the cylinder should work slightly out of adjustment the teeth would not be injured by coming in contact with the said piece.

I claim as my invention—

In a bark-machine, the combination of the grinding-cylinder N, provided with long projecting cutting-teeth $n$ $n$, &c., and short or scraping teeth $m$ $m$, &c., with the supporting-table K and its projections $h$ $h$, &c., and recesses $r$ $r$, &c., whereby the bark to be acted upon is supported to the very points of action of both the cutting and scraping teeth, all substantially as described, and for the purpose set forth.

WILLIAM E. NICKERSON.

Witnesses:
FRANK G. PARKER,
CHAS. E. GRIFFIN.